(12) United States Patent
Ferrari et al.

(10) Patent No.: US 8,118,074 B2
(45) Date of Patent: Feb. 21, 2012

(54) APPARATUS AND METHOD OF MATERIAL BONDING USING CAPTIVE PLUNGERS

(75) Inventors: Christopher Paul Ferrari, San Jose, CA (US); Curtis Gary Allen, Redwood City, CA (US); Andrew Dean White, Menlo Park, CA (US)

(73) Assignee: Altair Technologies, Inc, Melno Park, CA (US)

( * ) Notice: Subject to any disclaimer, the term of this patent is extended or adjusted under 35 U.S.C. 154(b) by 1072 days.

(21) Appl. No.: 11/786,263

(22) Filed: Apr. 10, 2007

(65) Prior Publication Data

US 2010/0252167 A1    Oct. 7, 2010

(51) Int. Cl.
*B30B 5/00* (2006.01)
*B29C 65/00* (2006.01)
*B23K 20/02* (2006.01)

(52) U.S. Cl. ............... 156/580; 100/258 R; 100/258 A; 100/265

(58) Field of Classification Search ............ 100/258 A, 100/259, 269.3, 269.1, 269.18, 266, 211, 100/295, 258 R, 265; 156/583.1, 580
See application file for complete search history.

(56) References Cited

U.S. PATENT DOCUMENTS

| | | | | | |
|---|---|---|---|---|---|
| 4,379,018 | A | * | 4/1983 | Griesdorn | 156/359 |
| 4,749,435 | A | * | 6/1988 | Kogane et al. | 156/308.4 |
| 4,855,011 | A | * | 8/1989 | Legge et al. | 156/583.1 |
| 5,170,704 | A | * | 12/1992 | Warren et al. | 101/41 |
| 5,312,507 | A | * | 5/1994 | Miller | 156/290 |
| 5,562,799 | A | * | 10/1996 | Ross et al. | 156/567 |
| 5,989,487 | A | * | 11/1999 | Yoo et al. | 266/249 |
| 6,309,591 | B1 | | 10/2001 | Yoo et al. | |
| 6,637,491 | B2 | * | 10/2003 | Massey et al. | 156/581 |
| 6,645,346 | B2 | | 11/2003 | Mii et al. | |

* cited by examiner

*Primary Examiner* — Katarzyna Wyrozebski Lee
*Assistant Examiner* — Scott W Dodds
(74) *Attorney, Agent, or Firm* — Raj Abhyanker, P.C

(57) ABSTRACT

An apparatus and method of material bonding using captive plungers is disclosed. In one embodiment, an apparatus includes a base plate to have multiple holes in an array, multiple captive plungers each surrounded by a compressible spring to couple to the multiple holes in such a way which allows each of the multiple captive plungers to vertically move in a confine of each of the multiple holes corresponding to the each of the multiple captive plungers, and a fastening device to apply a force to bond two or more parts placed on top of each other with a bonding material in between the two or more parts through pressing the base plate to the two or more parts such that the force delivered through the multiple captive plungers to the two or more parts is concentrated to the array.

20 Claims, 8 Drawing Sheets

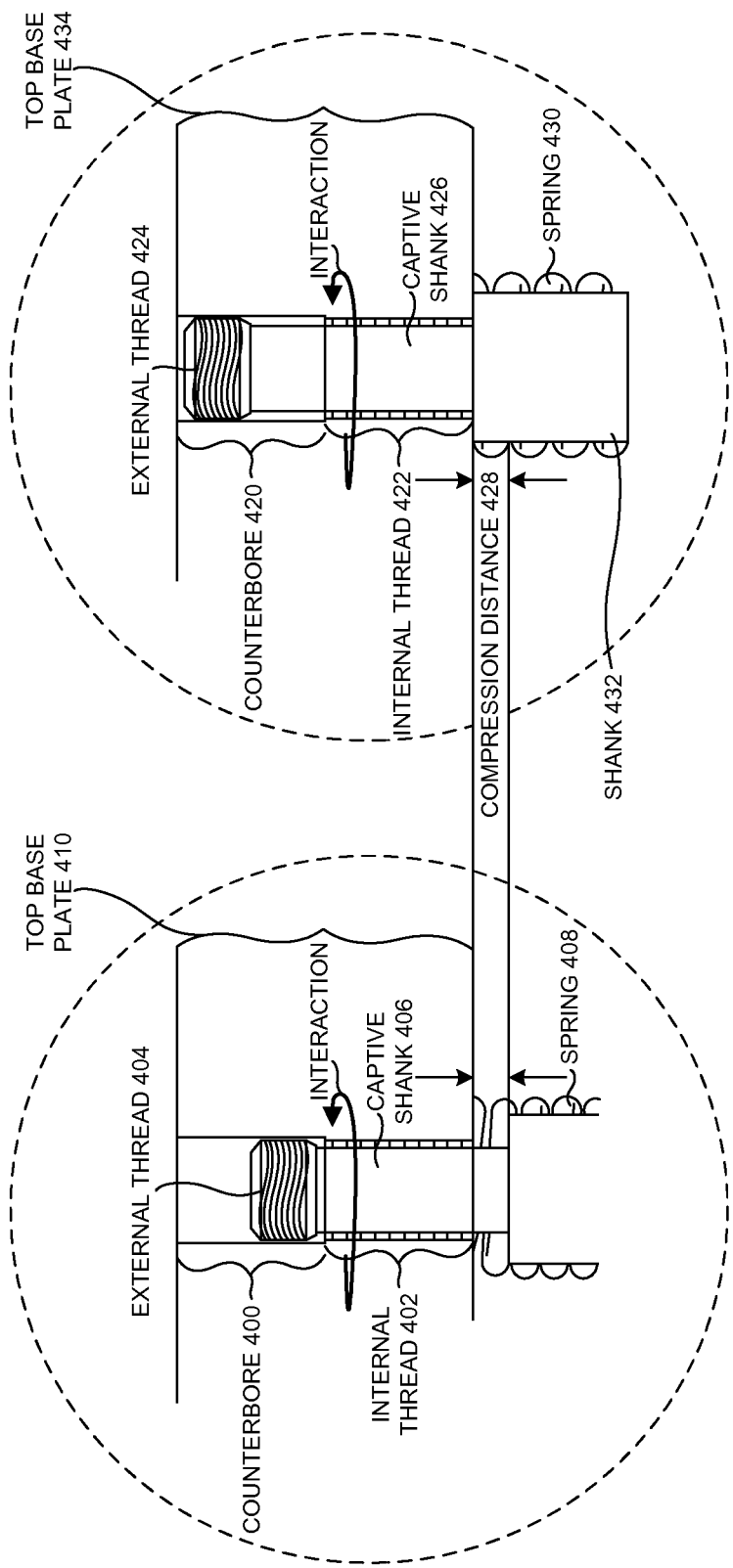

APPARATUS AND METHOD OF MATERIAL BONDING USING CAPTIVE PLUNGERS

FIELD OF TECHNOLOGY

This disclosure relates generally to technical fields of material bonding compression fixtures and, in one embodiment, to an apparatus and method of material bonding using captive plungers.

BACKGROUND

Spring loaded compressive forces may be used in material bonding processes (e.g., welding, soldering, brazing, epoxy function, etc.), using base plates, plungers, and/or high-temperature resistant springs (e.g., compressible). The plungers, each equipped with one of the high-temperature resistant springs, may provide a localized pressure and/or may be individually placed onto a designated surface of parts to be bonded. In one example, the plungers may be established and/or arranged atop a single-side and/or double-sided surface of the parts to be bonded following a specific pattern and/or array. Single sided configurations may require the placement of the plungers on the surface of the parts to be bonded, whereas, a double sided arrangement may require placing the plungers on the appropriate accompanying base plate. The parts to be bonded may then be placed between the base plates. The base plates (e.g., two base plates) may be pressed together until the base plates reach a desired distance, providing a specific resultant compressive force.

In a high-density plunger array (e.g., an assembly requiring 225 plungers), individually placing the plungers and/or associated components (e.g., spring assemblies) in their appropriate locations on the critical surfaces of the parts to be bonded or base plates may be very tedious and time-consuming. Even if the plungers and/or the associated components are successfully placed on the parts to be bonded or base plates, the plungers may tip over and/or become misaligned rather easily during the positioning of the base plates. Furthermore, accurately repeating a process of applying the compressive force may require a manual unloading and/or reloading of the plungers for each cycle of processing, which may become very time-consuming and tedious, especially in a case of the high-density plunger array.

A template of a specific pattern may be used to accurately place the plungers in necessary locations. The template may be designed (e.g., machined) to have holes slightly larger than a contact surface of each of the plungers. However, using the template may still be very labor intensive and/or time-consuming, especially when the high-density plunger array is required. In addition, removal of the template (e.g., or two templates) may be troublesome if the plungers are not accurately concentric with holes of the template, especially for patterns and/or arrays positioned on the base plate. Removing the template may cause plungers to fall over, further frustrating the process.

SUMMARY

A material bonding compression apparatus and method using captive plungers is disclosed. In one aspect, an apparatus includes a base plate to have multiple holes in an array, multiple captive plungers each surrounded by a compressible spring to couple to the multiple holes in such a way which allows each of the multiple captive plungers to vertically move in a confine of each of the multiple holes corresponding to the each of the multiple captive plungers, and a fastening device to apply a force to bond two or more parts placed on top of each other with a bonding material in between the two or more parts through pressing the base plate to the two or more parts through the multiple captive plungers concentrated to the array.

Each of the multiple captive plungers may be composed of a contact surface to place the each of the multiple captive plungers to the two or more parts, a shank affixed on a top of the contact surface to anchor the compressible spring, a captive shank affixed on a top of the shank to allow the each of the multiple captive plungers to vertically move in the confine of the each of the multiple holes, and an external thread affixed on a top of the captive shank to anchor the each of the multiple captive plungers to the each of the multiple holes. The fastening device may include a number of clamps to press the base plate to the two or more parts. The bonding material may be a braze alloy, a solder alloy, or an epoxy.

The apparatus may also include an external thread of the each of the multiple captive plungers to have a diameter smaller than a diameter of a counterbore of the each of the multiple holes but larger than a diameter of an internal thread of the each of the multiple holes such that the each of the multiple captive plungers is freely movable vertically but anchored to the counterbore. The internal thread of the each of the multiple holes may allow the external thread to reach the counterbore when the external thread is mated with the internal thread with an applied force.

The apparatus may further include another base plate placed below the two parts to provide a grip to the fastening device. In addition, the apparatus may include another set of captive plungers coupled to the another base plate to exert another force to a bottom of the two or more parts. Furthermore, the apparatus may include a number of mountable handles coupled to the base plate to provide a clasp to the base plate. Also, the apparatus may include a digitizer module coupled to the apparatus to generate a digital measurement based on a distance change of the compressible spring and/or a spring constant of the compressible spring. The apparatus also may include one or more supports coupled to a bottom surface of the another base plate.

In another aspect, a captive plunger includes a contact surface (e.g., which may be a rectangular pad, a spherical ball, a conical probe, a circular pad, a hexagonal pad, or an octagonal pad), a shank coupled on a top of the contact surface, and a captive shank coupled on a top of the shank to have an external thread.

The captive plunger may also include a compressible spring surrounding the captive plunger to have a length longer than a height of the shank such that the compressible spring is compressed when a force is applied on top of the compressible spring.

In yet another aspect, a method includes generating an array of holes on each of two base plates, each of the holes with an internal thread and a counterbore, coupling multiple captive plungers (e.g., which are secured to the counterbore of the each of the holes when an external thread of the each of the multiple captive plungers screws past the internal thread of the each of the holes) to the holes, each of the multiple captive plungers with a spring coiling around the each of the multiple captive plungers, placing two or more parts to be bonded between the two base plates (e.g., which may move closer to each other when a force compresses a spring coiling around the each of the multiple captive plungers), and bonding the two or more parts to be bonded through applying a force on one or more sides of the two base plates.

The method may also include selecting the spring with a unique spring constant, such that an intended amount of compressive force is applied to a localized area associated with the spring. In addition, the method may include treating the two or more parts to be bonded with one or more bonding material before performing the placing the two or more parts to be bonded. Moreover, the method may include performing the bonding the two or more parts to be bonded through applying the force using a fastening device (e.g., which may include a clamp, a buckle, a clasp, and/or a band).

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4A is an exploded view of the captive plunger/spring assembly of FIG. 1B coupled to the top base plate before a compression of the spring, according to one embodiment.

FIG. 4B is an exploded view of the captive plunger/spring assembly of FIG. 1B coupled to the top base plate after the compression of the spring, according to one embodiment.

Other features of the present embodiments will be apparent from the accompanying drawings and from the detailed description that follows.

DETAILED DESCRIPTION

An apparatus and method for material bonding compression with captive plungers is disclosed. In the following description, for the purposes of explanation, numerous specific details are set forth in order to provide a thorough understanding of the various embodiments. It will be evident, however to one skilled in the art, that the various embodiments may be practiced without these specific details.

Figure 5:
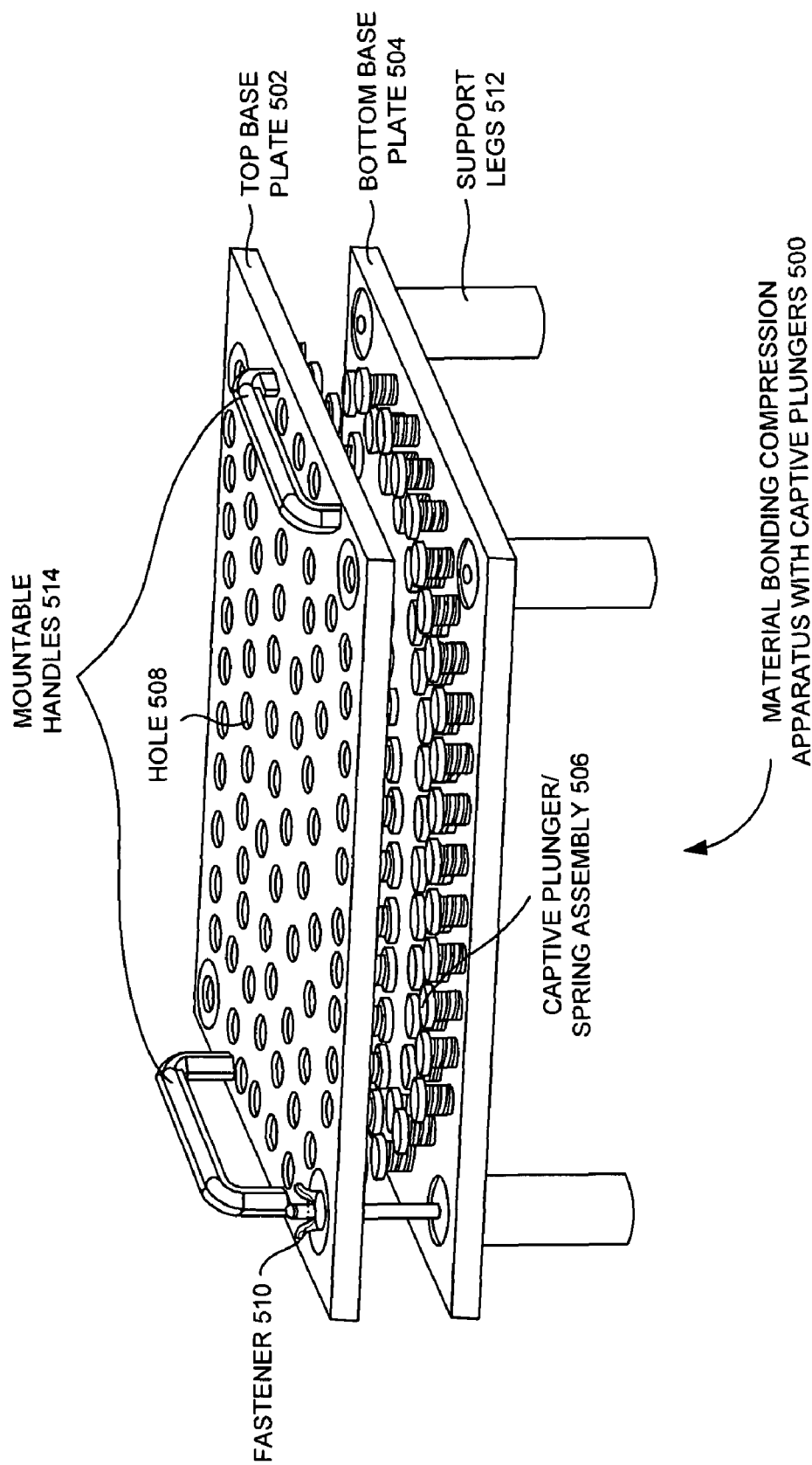
FIG. 5 is a three-dimensional view of a material bonding compression apparatus with captive plungers, according to one embodiment.

In one embodiment, an apparatus (e.g. a material bonding compression apparatus with captive plungers 500 of FIG. 5) includes a base plate (e.g., a top base plate 502 and/or a bottom base plate 504) to have multiple holes (e.g., a hole 508) in an array, multiple captive plungers each surrounded by a compressible spring (e.g., a captive plunger/spring assembly 506) to couple to the multiple holes in such a way which allows each of the multiple captive plungers to vertically move in a confine of each of the multiple holes corresponding to the each of the multiple captive plungers, and a fastening device (e.g., a fastener 510) to apply a force to bond two or more parts placed on top of each other with a bonding material in between the two or more parts through pressing the base plate to the two or more parts such that the force delivered through the multiple captive plungers to the two or more parts is concentrated to the array.

In another embodiment, a captive plunger (e.g., a captive plunger 100 of FIG. 1) includes a contact surface (e.g., which may be a rectangular pad, a spherical ball, a conical probe, a circular pad, a hexagonal pad, or an octagonal pad as illustrated in FIG. 2), a shank (e.g., a shank 106) coupled on a top of the contact surface, and a captive shank (e.g., a captive shank 104) coupled on a top of the shank to have an external thread (e.g., an external thread 102).

In yet another embodiment, a method includes generating an array of holes on each of two base plates, each of the holes with an internal thread and a counterbore (e.g., a counterbore 400 of FIG. 4), coupling multiple captive plungers to the base plates through the holes, each of the multiple captive plungers with a spring (e.g., a spring 152 of FIG. 1) coiling around the each of the multiple captive plungers, placing two or more parts to be bonded (e.g., parts to be bonded 304 of FIG. 3) between the two base plates, and bonding the two or more parts to be bonded through applying a force on one or more sides of the two base plates. The coupling of multiple captive plungers through the holes may enable the captive plungers to be help captive within the confines of the counterbores of the holes to which the respective captive plungers may be anchored.

Figure 1A:
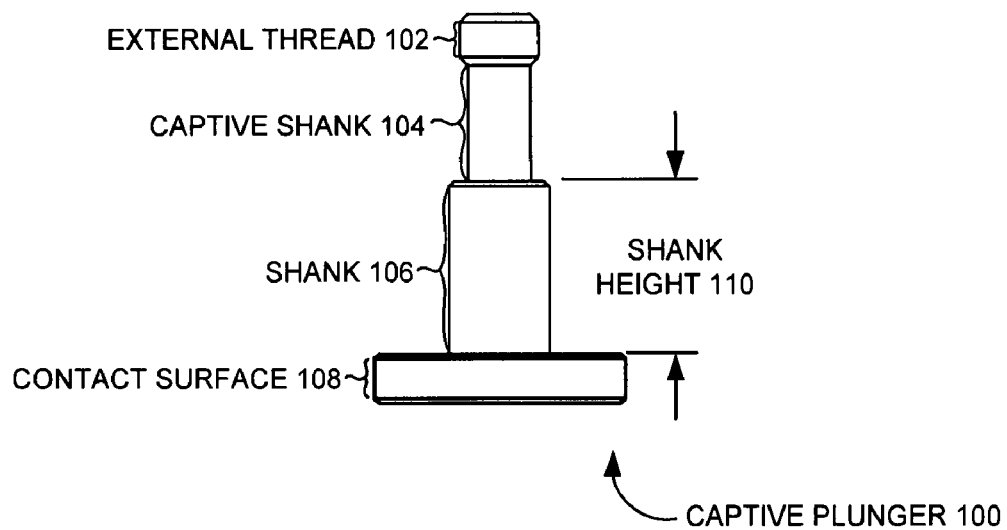
FIGS. 1A and 1B are two-dimensional views of a captive plunger and a captive plunger/ spring assembly, respectively, according to one embodiment.
Figure 1B:
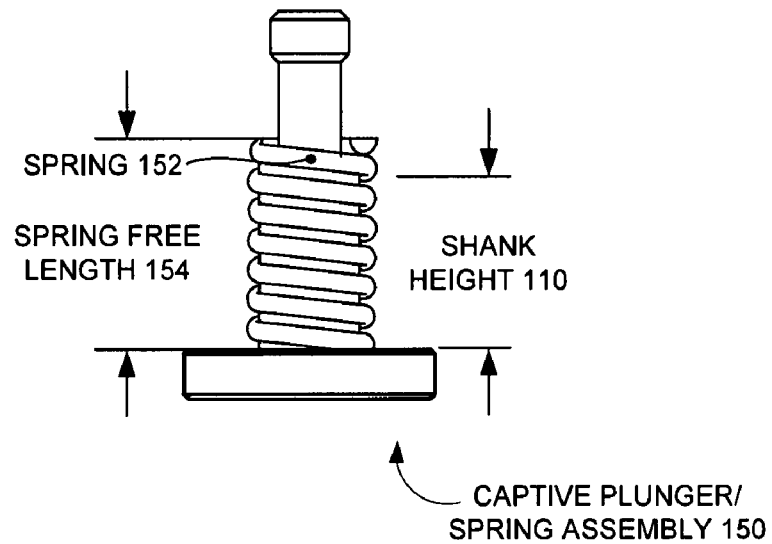

FIGS. 1A and 1B are two-dimensional views of a captive plunger 100 and a captive plunger/ spring assembly 150, respectively, according to one embodiment. In FIG. 1A, the captive plunger 100 includes an external thread 102, a captive shank 104, a shank 106 with a shank height 110, and a contact surface 108. The external thread 102 may convert rotary motion into linear, and may prevent linear motion without a corresponding rotating motion. Because of the conversion of rotary motion into linear motion, external thread 102 may be received within a counterbore of a hole within which captive plunger 100 is held "captive." In one example embodiment, the external thread 102 may be generated based on a corresponding internal thread and the counterbore of the hole of a base plate (e.g., which is illustrated in FIG. 4).

The captive shank 104 may vary in length and may have a smaller diameter than the external thread 102. The shank 106 may have a larger diameter than the captive shank 104, and may be affixed to the contact surface 108. The contact surface 108 may have a plurality of geometries (e.g., a rectangular pad, spherical ball, etc.).

In FIG. 1B, the captive plunger 100 may be surrounded by a spring 152, which may form a captive plunger/spring assembly 150, according to one embodiment. The spring 152 may have a spring free length 154 (e.g., a length of spring before compression) and a number of other spring characteristics (e.g., a spring constant, high-temperature resistant material). The spring free length 154 may be longer than the shank height 110 so that the spring may be compressed to a distance.

In one example embodiment, a captive plunger may include a contact surface to place the captive plunger to two or more parts (e.g., to be attached), a shank affixed on a top of the contact surface to anchor a compressible spring, a captive shank affixed on a top of the shank to allow the captive plunger to vertically move in the confine of each hole (e.g., of a base plate), and an external thread affixed on a top of the captive shank to anchor the captive plunger within the hole (e.g., to the base plate) through a vertical (and rotary) movement of the captive plunger such that the captive plunger is held within the confines of a counterbore of the hole. The compressible spring surrounding the captive plunger may have a length longer than a height of the shank such that the compressible spring is compressed when a force is applied on top of the compressible spring.

Figure 2A:
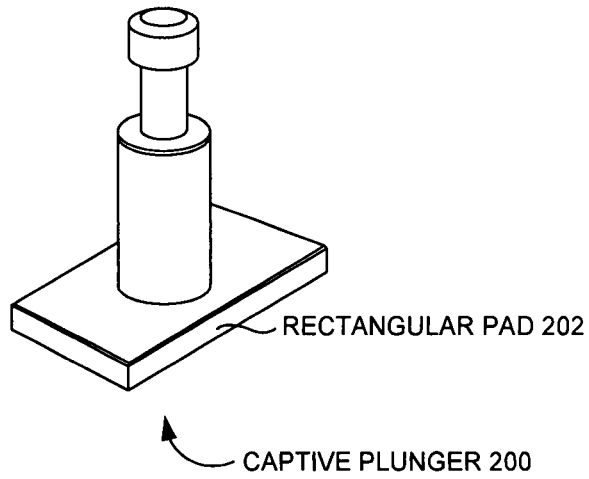
FIGS. 2A, 2B, 2C, 2D, 2E, and 2F are three-dimensional views of the captive plunger of FIG. 1 each with a unique contact surface, according to one embodiment.
Figure 2B:
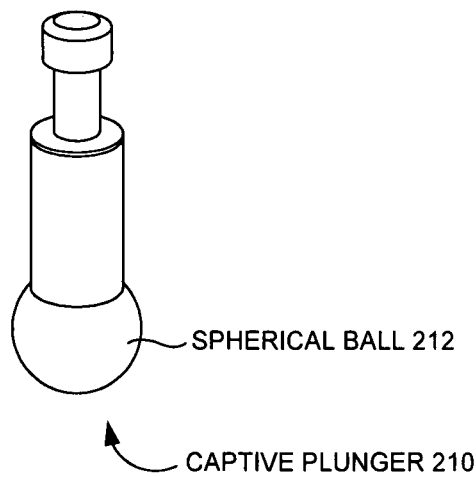

FIGS. 2A, 2B, 2C, 2D, 2E, and 2F are each three-dimensional views of the captive plunger of FIG. 1 each with a unique contact surface, according to one embodiment. In FIG. 2A, a captive plunger 200 may have a rectangular pad 202 as its contact surface, according to one embodiment. The rectangular pad 202 may vary in dimensions (e.g., a length, a width, etc.). In FIG. 2B, a captive plunger 210 may have a spherical ball 212 as its contact surface, according to one embodiment. The spherical ball 212 may vary in dimensions (e.g., a radius, a surface area, etc.)

Figure 2C:
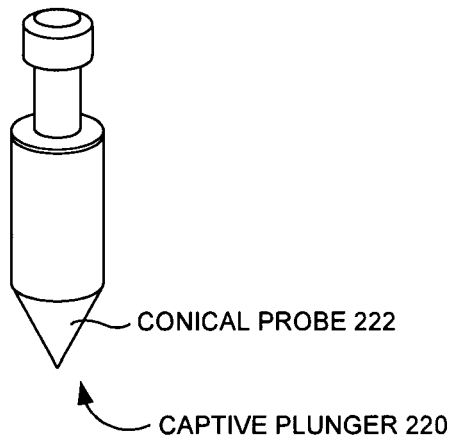
Figure 2D:
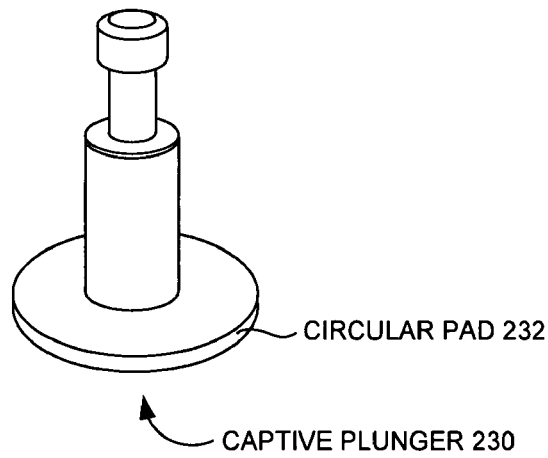

In FIG. 2C, a captive plunger 220 may have a conical probe 222 as its contact surface, according to one embodiment. The conical probe 222 may vary in dimensions (e.g., the radius, a height, etc.) and may be used to achieve a higher localized pressure. In FIG. 2D, a captive plunger 230 may have a circular pad 232 as its contact surface, according to one embodiment. The circular pad 232 may vary in dimensions (e.g., the radius, the height, etc.).

Figure 2E:
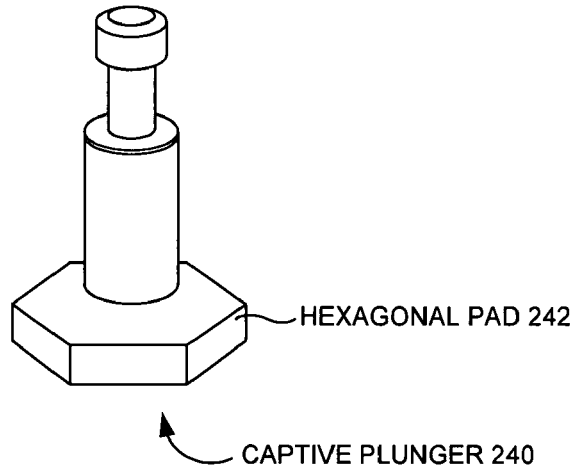
Figure 2F:
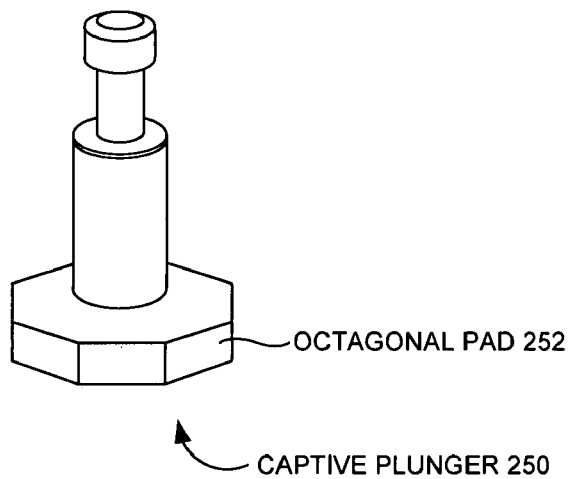

In FIG. 2E, a captive plunger 240 may have a hexagonal pad 242 as its contact surface, according to one embodiment. The hexagonal pad 242 may vary in dimensions (e.g., the length, the width, etc.). In FIG. 2F, a captive plunger 250 may have a octagonal pad 252 as its contact surface, according to one embodiment. The octagonal pad 252 may vary in dimensions (e.g., the length, the width, etc.).

Figure 3A:
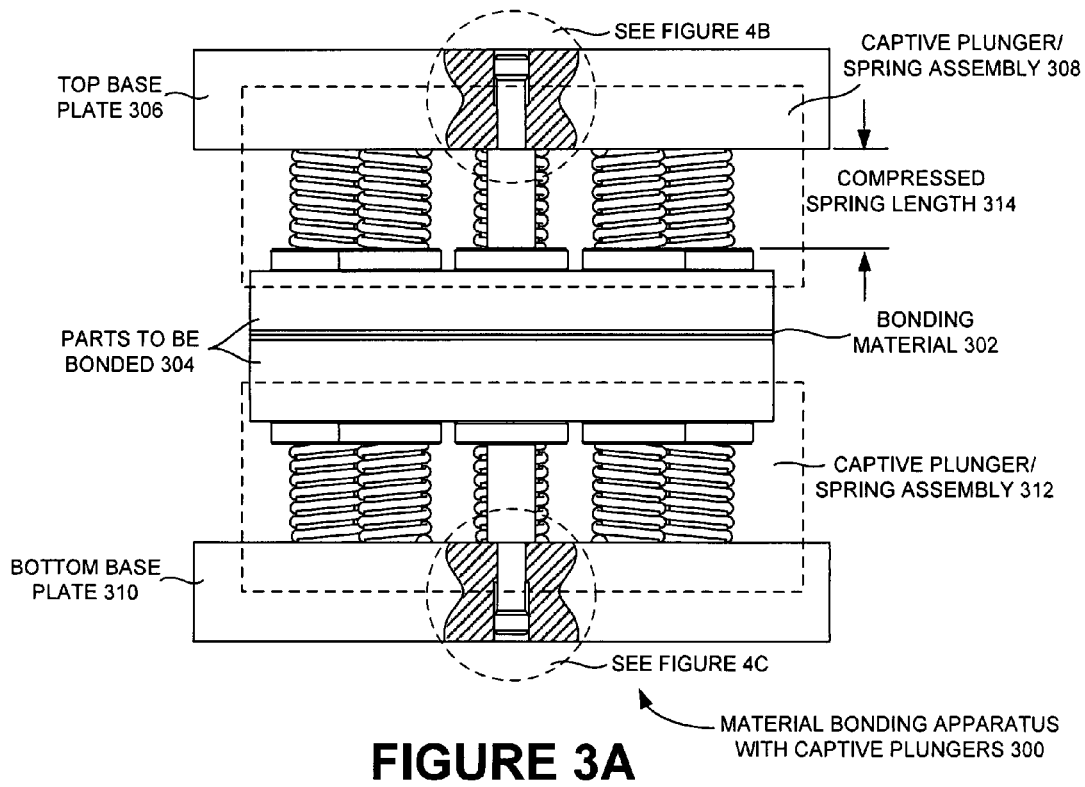
FIG. 3A is a two-dimensional view of captive plunger/ spring assembly coupled to a top base plate and a bottom base plate, according to one embodiment.

FIG. 3A is a two-dimensional view of captive plunger/spring assembly 308 coupled to a top base plate 306 and a bottom base plate 310, according to one embodiment. A material bonding compression apparatus with captive plungers 300 may include a bonding material 302, parts to be bonded 304, the top base plate 306, the captive plunger/spring assembly 308, the bottom base plate 310, and captive plunger/spring assembly 312.

The material bonding compression apparatus with captive plungers 300 may apply a compressive force to the parts to be bonded 304 (e.g., two, three, four, etc.). The parts to be bonded 304 (e.g., made of aluminum, steel, etc.) may be bonded together using the bonding material 302 (e.g., brazing alloy, soldering alloy, epoxy, etc.). A bonding process (e.g., soldering, brazing, epoxy fusion, etc.) may require a compressive force on the parts to be bonded 304, which may be provided by the material bonding compression apparatus with captive plungers 300.

The top base plate 306 may be coupled with the captive plunger/spring assembly 308 (e.g., or multiples of the captive plunger/spring assembly 308). A coupling of the captive plunger/spring assembly 308 to the top base plate 306 may be best understood with reference to FIG. 4B. The captive plunger/spring assembly 308 may propagate the compressive force on the parts to be bonded 304. This may be achieved when the top base plate compresses springs (e.g., the spring 152 of FIG. 1B) of the captive plunger/spring assembly 308. The spring free length 154 may be longer than the shank height 110, thus allowing the spring to compress to a certain distance. In FIG. 3, the spring may have a compressed spring length 314, resulting from an application of the compressive force of the top base plate 306. The compressed spring length 314 may be a length shorter than the spring free length 154.

The bottom base plate 310 (e.g., which may be placed below the two parts to be bonded to provide a grip to the fastening device) may be coupled with the captive plunger/spring assembly 312. The coupling of the captive plunger/spring assembly 312 to the bottom base plate 310 may be best understood with reference to FIG. 4C. The captive plunger/spring assembly 312 (e.g., or multiples of the captive plunger/spring assembly 312) may apply the compressive force on the parts to be bonded 304. This may be achieved when a gravitational force of the plurality of objects (e.g., the parts to be bonded 304, the bonding material 302, the top base plate 306, etc.) loaded above the captive plunger/spring assembly 312 compresses the springs of the captive plunger/spring assembly 312. A normal force upwards may cause the compressive force from below applied to the parts to be bonded 304.

Figure 3B:
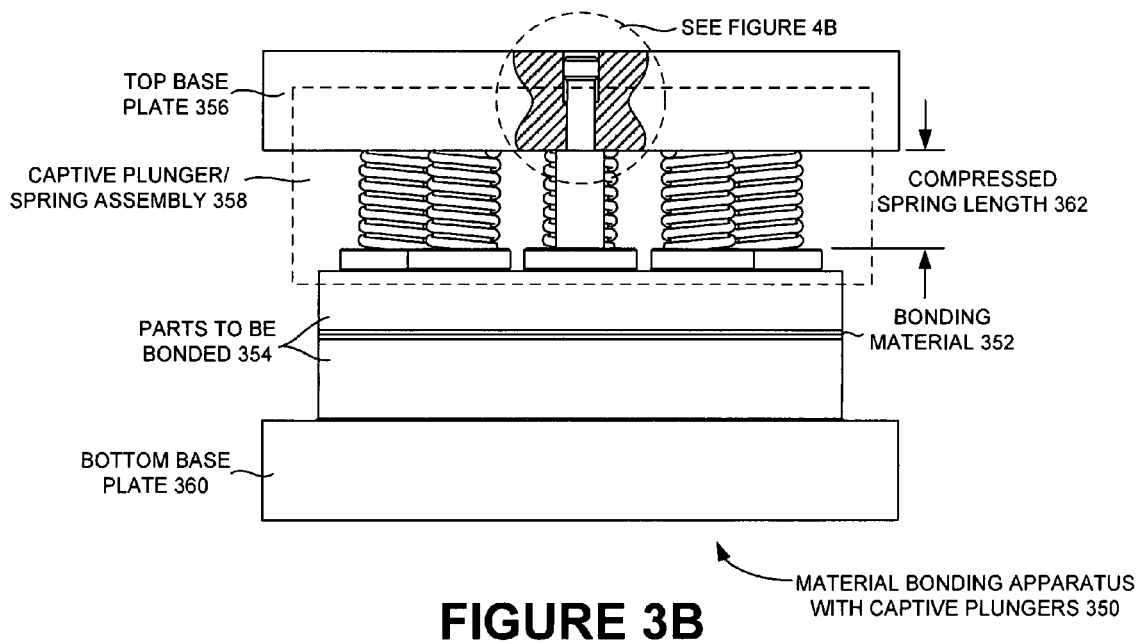
FIG. 3B is a two-dimensional view of the captive plunger/ spring assembly coupled to the top plate only, according to one embodiment.

FIG. 3B is a two-dimensional view of captive plunger/spring assembly 358 coupled to a top plate 356 only, according to one embodiment. A material bonding apparatus with captive plungers 350 may include a bonding material 352, parts to be bonded 354, the top base plate 356, the captive plunger/spring assembly 358, and a bottom base plate 360.

The material bonding compression apparatus with captive plungers 350 may apply a compressive force to the parts to be bonded 354. The parts to be bonded 354 (e.g., aluminum, steel, etc.) may be bonded together using the bonding material 352 (e.g., brazing alloy, soldering alloy, epoxy, etc.). A bonding process (e.g., soldering, brazing, epoxy fusion, etc.) may require the compressive force on the parts to be bonded 354, which may be provided by the material bonding compression apparatus with captive plungers 350.

The top base plate 356 may be coupled with the captive plunger/spring assembly 358 (e.g., or multiples of the captive plunger/spring assembly 358). The coupling of the captive plunger/spring assembly 308 to the top base plate 356 may be best understood with reference to FIG. 4B. The captive plunger/spring assembly 358 may apply a compressive force on the parts to be bonded 354. This may be achieved when the top base plate compresses the spring of the captive plunger/spring assembly 358. The spring free length 154 may have a longer length than the shank height 110, which may allow the spring to compress a certain distance.

In FIG. 3, the spring may have a compressed spring length 362, due to the gravitational force of the top base plate 356. The compressed spring length 362 may be a length shorter than the spring free length 154. The parts to be bonded 354 may be loaded on the bottom base plate 360.

FIGS. 4A is an exploded view of the captive plunger/spring assembly 150 of FIG. 1B coupled to a top base plate 410 before a compression of a spring 408, according to one embodiment. FIG. 4A illustrates a counterbore 400, an internal thread 402, an external thread 404, a captive shank 406, the spring 408, the top base plate 410, and a compression distance 428. The counterbore 400 and internal thread 402 may be generated (e.g., machined, etc.) on the top base plate 410.

The counterbore 400 may have a larger diameter than the internal thread 402. The captive plunger/spring assembly 150, having the external thread 404, the captive shank 406, and the spring 408, may be coupled to the top base plate 410 by mating (e.g., through turning the external thread 404 against the internal thread 402) the external thread 404 with the internal thread 402 until the external thread 404 is captivated in the counterbore 400. Although the external thread 404 is configured to mate with the internal thread 402 based on a screw mechanism, the external thread 404 may have a major diameter larger than a minor diameter of the internal thread 402, but smaller than the inner diameter of the counterbore 400, so that the external thread 404 may not escape the counterbore 400 after screwing past the internal 402 and being received within the counterbore 400.

The captive shank 406 may move through the internal thread and may have a portion of the captive shank 406 outside of the top base plate 410. The portion of the captive shank outside of the top base plate 410 may be surrounded by the spring 408 and may move into the internal thread when the spring 408 is compressed. The process may be best understood in FIG. 4B.

FIG. 4B is an exploded view of the captive plunger/spring assembly 150 of FIG. 1B coupled to a top base plate 434 after a compression of a spring 434, according to one embodiment. FIG. 4B illustrates a counterbore 420, an internal thread 422, an external thread 424, a captive shank 426, a compression distance 428, the spring 430, a shank 432 and the top base plate 434. FIG. 4B displays the captive plunger/spring assembly coupled to the top base plate 420 and the spring 430 compressed to a compression distance 428. The external thread 424 may advance through the internal thread 422 to a distance through the counterbore 420 when a compressive force is applied.

The spring 430 may be compressed to the compression distance 428, and the captive shank 426 may be pushed further through the internal thread 422 and into the counterbore 420. The spring 430 may be compressed by the compression distance 428 which is equal to the difference between the spring free length 154 and the shank height 110 of FIG. 1. This may be the maximum compression distance realized when the shank 432 contacts the top base 434. The compressed spring length 314 of FIG. 3 may then be equal to the shank height 110 of FIG. 1.

In another example embodiment, the compression distance 428 may be less than the difference between the spring free length 154 and the shank height 110. The shank 432 may not be in contact with the top base plate 434 and the spring 430 may not be compressed to its maximum spring length. (e.g., the applied force is not large enough to fully compress the spring). The compression distance may be controlled to obtain a desired magnitude of compressive force on the parts to be bonded 304. The compressive force may be determined by the compression distance 428 and/or a spring constant of the spring 430.

Figure 4C:
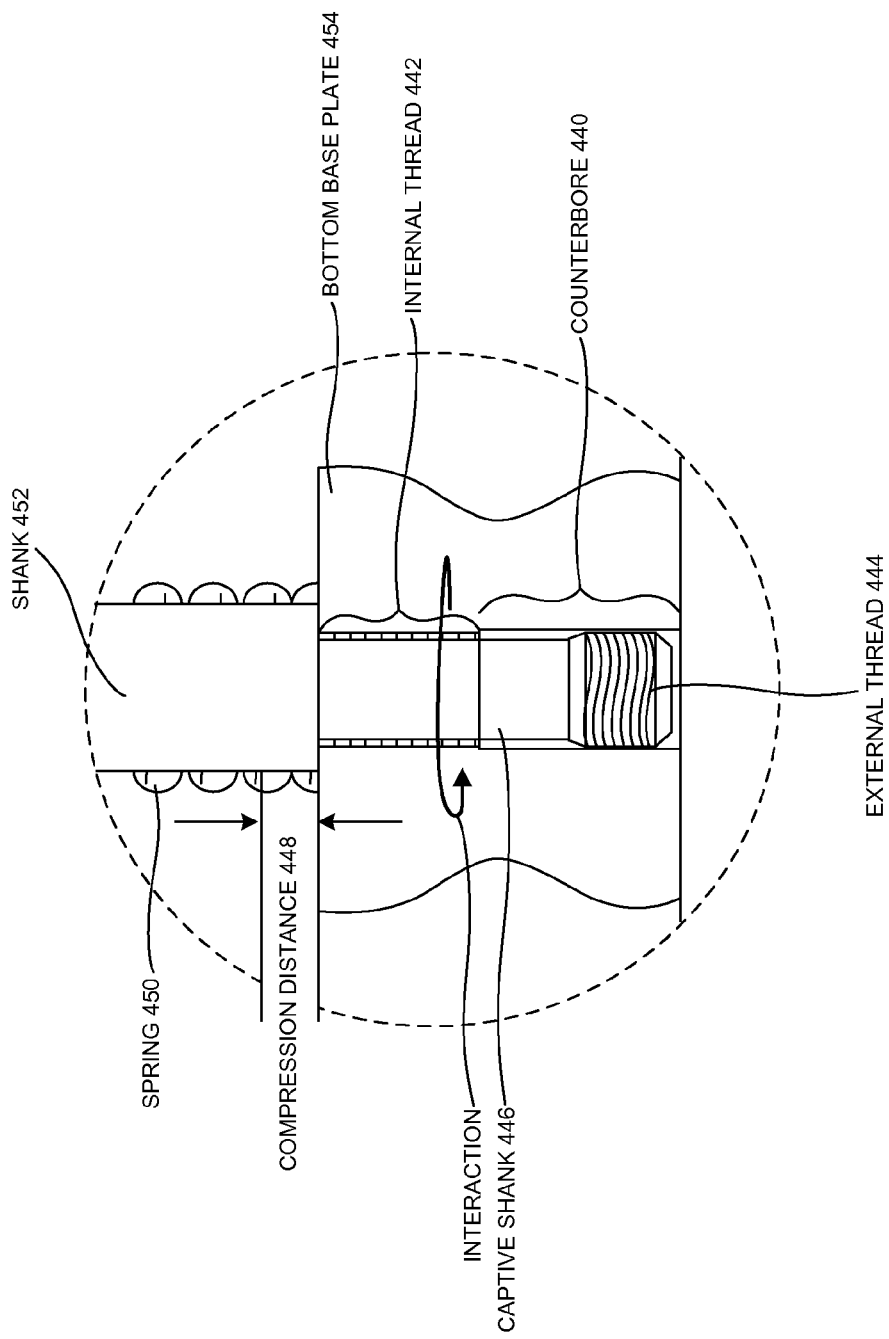
FIG. 4C is an exploded view of the captive plunger/spring assembly of FIG. 1B couple to the bottom base plate after the compression of the spring, according to one embodiment.

FIG. 4C is an exploded view of the captive plunger/spring assembly 150 of FIG. 1B coupled to a bottom base plate 454 after a compression of a spring 450, according to one embodiment. FIG. 4C illustrates a counterbore 440, an internal thread 442, an external thread 444, a captive shank 446, a compression distance 448, the spring 450, a shank 452, and the bottom base plate 454. The external thread 444 may be advanced through the internal thread 442 and captivated in the counterbore 440. The spring may be compressed to a compression distance 448, causing the captive plunger to move through the bottom base plate 454 a distance equal to the compression distance 448 of the spring 450.

FIG. 5 is a three-dimensional view of a material bonding compression apparatus with captive plungers 500, according to one embodiment. The material bonding compression apparatus with captive plungers 500 may include a top base plate 502, a bottom base plate 504, multiples of a captive plunger/spring assembly 506, multiples of a hole 508, a fastener 510, support legs 512, and mountable handles 514. The top base plate 502 and bottom base plate 504 may have the multiples of the hole 508 generated (e.g., through drilling, etc.) through them. The captive plunger/spring assembly 506 may then be coupled through the hole 508, so it may be captivated by the top base plate 502 and the bottom base plate 504.

The parts to be bonded 304 and the bonding material 302 of FIG. 3 may be loaded on top of the bottom base plate 504 and below the top base plate 502. The fastener (e.g., clamp, buckle, clasp, band, etc.) 510 may be used to position the top base plate 502 and the bottom base plate 504 and/or may be used to calibrate a distance between the top base plate 502 and the bottom base plate 504. The distance change may provide a compressive force on the parts to be bonded 304 (e.g., through compressing the spring 152 of FIG. 1 of the captive plunger/spring assembly 506). The support legs 512 may be used to elevate the material bonding compression apparatus with captive plungers 500 to a desired height. The mountable handles 514 may be used to load the top base plate 502 on top of the parts to be bonded 304 when a material bonding process is desired.

In one example embodiment, a digitizer module may be coupled to the material bonding compression apparatus with captive plungers 500 to generate a digital measurement (e.g., a weight, a pressure, a temperature, etc.) based on a distance change of the compressible spring and/or a spring constant of the compressible spring.

Figure 6:
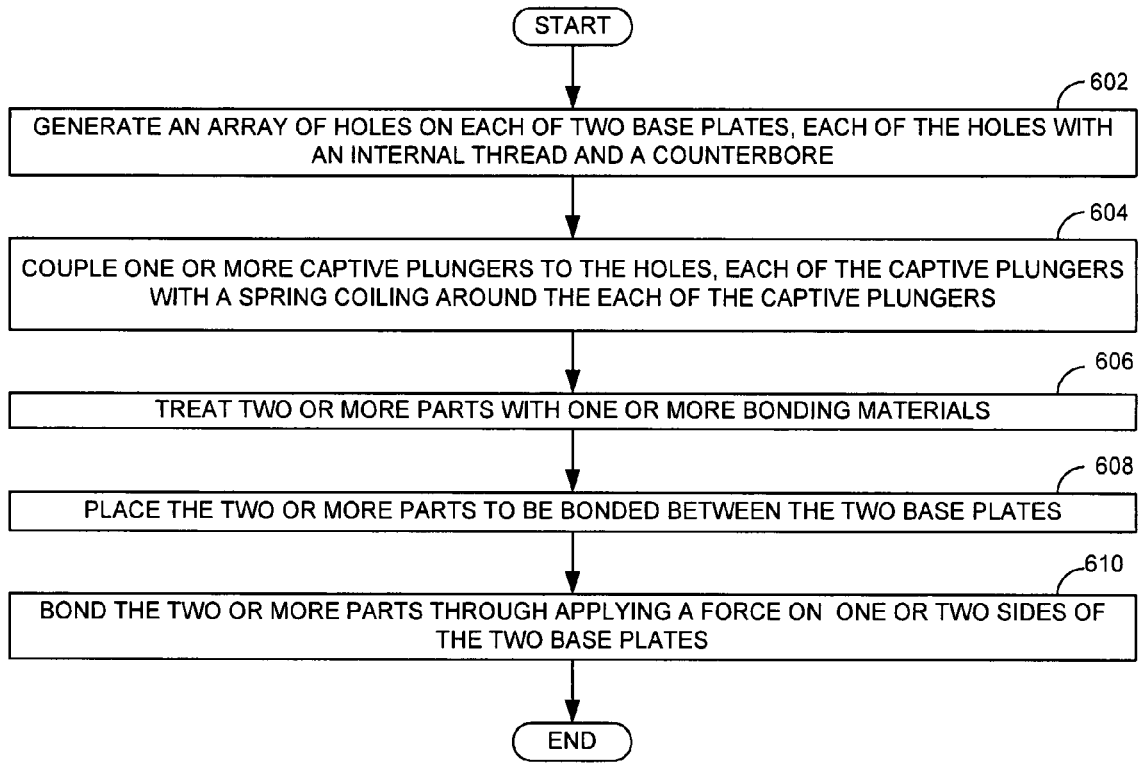
FIG. 6 is a process flow of bonding two or more parts using the material bonding compression apparatus of FIG. 5, according to one embodiment.

FIG. 6 is a process flow of bonding two or more parts using the material bonding compression apparatus with captive plunger, according to one embodiment. In operation 602, an array of holes (e.g., holes 508 in FIG. 5) may be generated on each of two base plates (e.g., the top base plate 502 and the bottom base plate 504 of FIG. 5). The holes may include a counterbore (e.g., the counterbore 400 in FIG. 4) and an internal thread (e.g., the internal thread 402 in FIG. 4). The holes may be generated by a process (e.g., machining) and may have a diameter corresponding to that of a captive plunger.

In operation 604, one or more captive plungers may be coupled to the holes (e.g., the holes 508 in FIG. 5). The one or more captive plungers may have a spring (e.g., spring 152 of FIG. 1) coiling around the each of the one or more captive plungers (e.g., the captive plunger 100 in FIG. 1). The one or more captive plungers may be advanced through the holes such that the external thread (e.g., the external thread 404 in FIG. 4A) may be held captive within confines of a counterbore (e.g., the counterbore 400 in FIG. 4A).

In operation 610, the two or more parts may be bonded through applying a force (e.g., a compressive force) on one or two sides of the two base plates. This compressive force may derive from a compression of a plurality of springs (e.g., the spring 408 in FIG. 4A). A compression distance (e.g., the compression distance 428 of FIG. 4B) may be controlled by a fastener (e.g., a clamp) which may be used to adjust a force applied from the two base plates.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:
1. An apparatus, comprising:
 a base plate having a plurality of holes in an array, each of the holes being delimited by an internal thread and a counterbore;
 a plurality of captive plungers corresponding to the array of holes, each of the plurality of captive plungers being configured to be received within a compressible spring such that the compressible spring wraps around the captive plunger, a combination of the plunger and the spring to interact with the plurality of holes in such a way that allows each of the plurality of captive plungers to vertically move within confines of each of the plurality of holes corresponding to the each of the plurality of captive plungers; and a fastening device to apply a force to bond at least two parts placed on top of each other with a bonding material in between, the force to be applied to the at least two parts to press the base plate against the at least two parts such that the force delivered through the plurality of captive plungers to the at least two parts is concentrated to the array, wherein the each of the plurality of captive plungers includes an external thread that is configured to screw past the internal thread of the each of the holes to be received within the counterbore when the force is applied through the fastening device such that the each of the plurality of captive plungers is held captive within confines of the counterbore of the each of the holes, a major diameter of the external thread being smaller than an inner diameter of the counterbore and larger than a minor diameter of the internal thread to enable retention of the external thread within the confines of the counterbore.

2. The apparatus of claim 1, wherein the each of the plurality of captive plungers comprises a contact surface to place the each of the plurality of captive plungers against the at least two parts, a shank affixed on a top of the contact surface to anchor the each of the plurality of captive plungers within the compressible spring, and a captive shank affixed on a top of the shank to allow the each of the plurality of captive plungers to vertically move within the confines of the each of the plurality of holes.

3. The apparatus of claim 1, wherein the fastening device includes a plurality of clamps to press the base plate against the at least two parts.

4. The apparatus of claim 1, wherein the bonding material includes at least one of a braze alloy, a solder alloy, and an epoxy.

5. The apparatus of claim 2, wherein a shape of the contact surface is one of a rectangular pad, a spherical ball, a conical probe, a circular pad, a hexagonal pad, and an octagonal pad.

6. The apparatus of claim 1, wherein the internal thread of the each of the plurality of holes and the external thread are appropriately threaded to allow the external thread to screw past the internal thread to be received within the counterbore when the force is applied through the fastening device, and the counterbore is unthreaded.

7. The apparatus of claim 1, further comprising an additional base plate placed below the at least two parts, the additional base plate enabling the at least two parts to be in place between the base plate and the additional base plate.

8. The apparatus of claim 7, further comprising another set of captive plungers coupled to the additional base plate to exert another force to a bottom of the at least two parts.

9. The apparatus of claim 8, further comprising a plurality of mountable handles coupled to the base plate to mount the base plate against the at least two parts to be bonded.

10. The apparatus of claim 1, further comprising a digitizer module configured to generate a digital measurement of at least one of weight, pressure and temperature based on a distance change of the compressible spring.

11. The apparatus of claim 9, further comprising at least one support coupled to a bottom surface of the additional base plate.

12. A captive plunger mechanism comprising:
a contact surface;
a shank coupled on a top of the contact surface;
a captive shank, coupled on a top of the shank and having an external thread associated therewith;
a compressible spring configured to receive the captive shank such that the compressible spring wraps around the captive shank; and
a complementary element including a hole delimited by an internal thread and a counterbore, the complementary element being configured to capture the external thread within confines of the counterbore after the external thread screws past the internal thread following an application of an appropriate force to the complementary element,
wherein a major diameter of the external thread is smaller than an inner diameter of the counterbore and larger than a minor diameter of the internal thread to enable retention of the external thread within the confines of the counterbore.

13. The captive plunger mechanism of claim 12, wherein a shape of the contact surface is one of a rectangular pad, a spherical ball, a conical probe, a circular pad, a hexagonal pad, and an octagonal pad.

14. The captive plunger mechanism of claim 12, wherein the compressible spring surrounding the captive plunger has a length longer than a height of the shank such that the compressible spring is compressed when the force is applied to the contact surface.

15. A method comprising:
generating an array of holes on each of two base plates, each of the holes being delimited by an internal thread and a counterbore;
coupling a plurality of captive plungers to the holes through:
receiving each of the plurality of captive plungers within a compressible spring such that the compressible spring wraps around the each of the plurality of captive plungers;
screwing an external thread of the each of the plurality of captive plungers past the internal thread of the each of the holes such that the external thread is received within the counterbore upon application of a force on at least one side of the two base plates; and
holding, after screwing past the internal thread, the external thread of the each of the plurality of captive plungers captive within confines of the counterbore of the each of the holes through the external thread having a major diameter smaller than an inner diameter of the counterbore and larger than a minor diameter of the internal thread;
placing at least two parts between the two base plates; and
bonding the at least two parts through applying the force on the at least one side of the two base plates.

16. The method of claim 15, comprising providing appropriate threading on the external thread and the internal thread and an unthreaded counterbore to enable the external thread to screw past the internal thread to be received within the counterbore upon the application of the force.

17. The method of claim 16, wherein the two base plates move closer to each other when the force compresses the spring wrapping around the each of the plurality of captive plungers.

18. The method of claim 17, further comprising selecting the spring with a unique spring constant such that an intended amount of compressive force is applied to a localized area associated with the spring.

19. The method of claim 17, further comprising treating the at least two parts with at least one bonding material before the placement thereof.

20. The method of claim 17, further comprising performing the bonding of the at least two parts by applying the force using a fastening device, wherein the fastening device includes at least one of a clamp, a buckle, a clasp, and a band.

* * * * *